M. BICHEROUX.
MANUFACTURE OF RAW PLATE GLASS.
APPLICATION FILED FEB. 25, 1914.
1,175,116.
Patented Mar. 14, 1916.
2 SHEETS—SHEET 1.
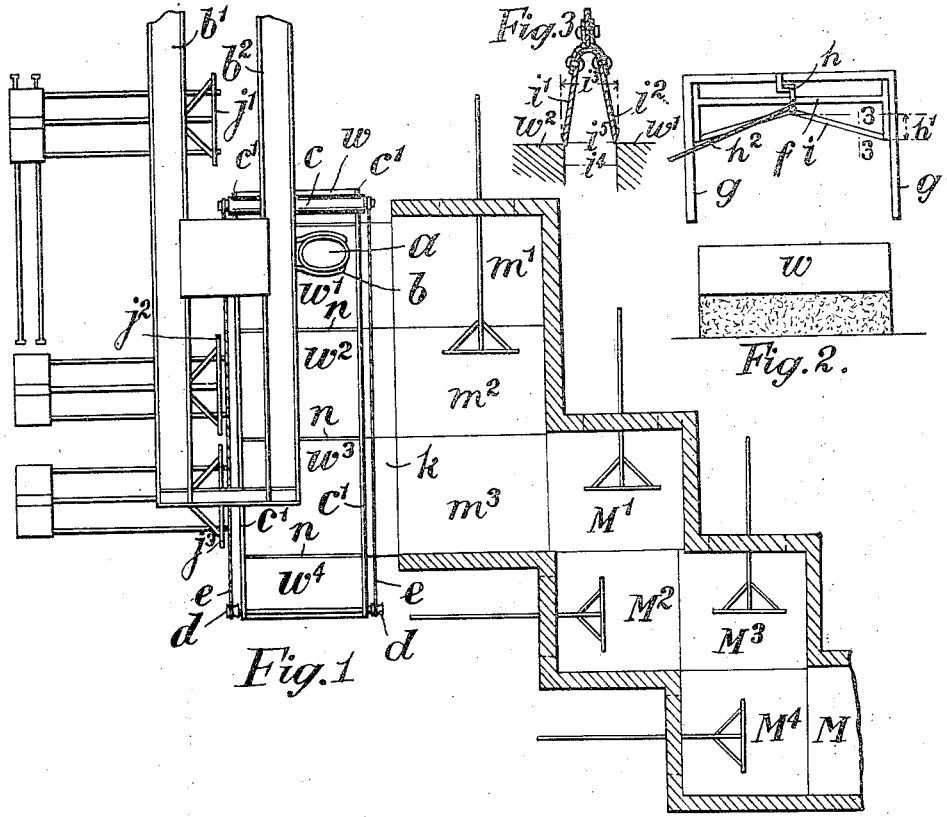
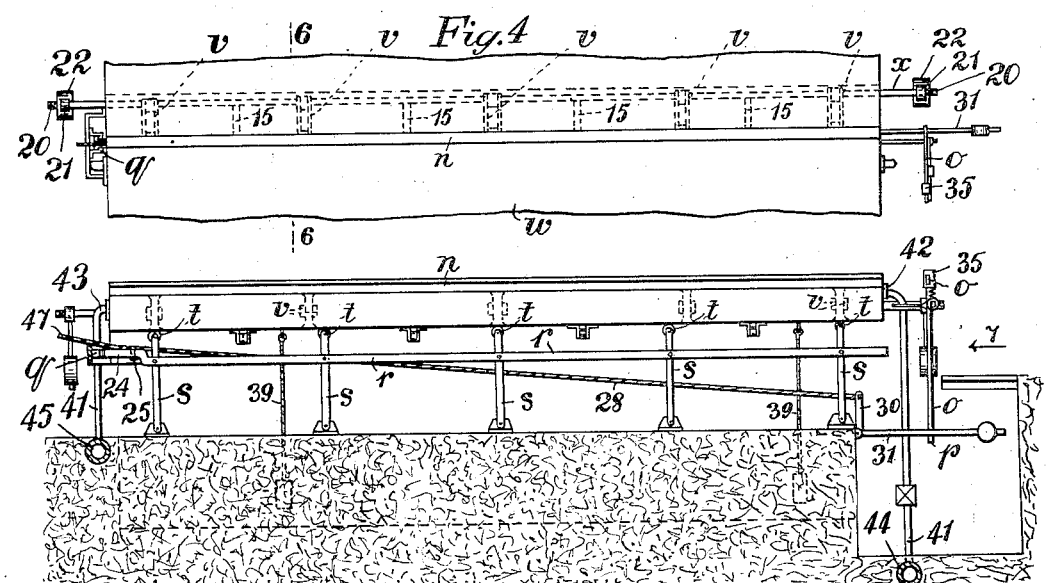
Witnesses:
Robert Craig Greene
Inventor:
Max Bicheroux
by Wallace Greene, Attorney.

M. BICHEROUX.
MANUFACTURE OF RAW PLATE GLASS.
APPLICATION FILED FEB. 25, 1914.

1,175,116.

Patented Mar. 14, 1916.

2 SHEETS—SHEET 2.

Witnesses:
S. M. Drainer
Robert Craig Greene

Inventor,
Max Bicheroux
by
Wallace Lunce, Attorney.

UNITED STATES PATENT OFFICE.

MAX BICHEROUX, OF HERZOGENRATH, GERMANY, ASSIGNOR TO BICHEROUX, LAMBOTTE AND CIE., GESELLSCHAFT MIT BESCHRANKTER HAFTUNG, OF HERZOGENRATH, GERMANY.

MANUFACTURE OF RAW PLATE-GLASS.

1,175,116.  Specification of Letters Patent. Patented Mar. 14, 1916.

Application filed February 25, 1914. Serial No. 820,832.

*To all whom it may concern:*

Be it known that I, MAX BICHEROUX, a citizen of the German Empire, residing at Herzogenrath, Rheinland, Germany, have invented certain new and useful Improvements in and Relating to the Manufacture of Raw Plate-Glass, of which the following is a specification.

This invention relates to the manufacture of raw plate glass and more particularly to improved apparatus by means of which a plurality of plates may be cast from the contents of a single pot rolled out into plates and annealed.

One object of the present invention is to provide a method of working by means of which simultaneous, or practically simultaneous, handling of all the plates is rendered easier.

Another object of this invention is to provide improved means for producing such a plurality of plates from the contents of a single pot.

The invention is generally applicable to the manufacture of plate glass, but is more particularly designed for the manufacture of thin raw plate glass, which is about 6 to 8 mm. in thickness.

The invention will be more readily understood from the following description of the process and apparatus made with reference to the accompanying drawings.

Figure 6:
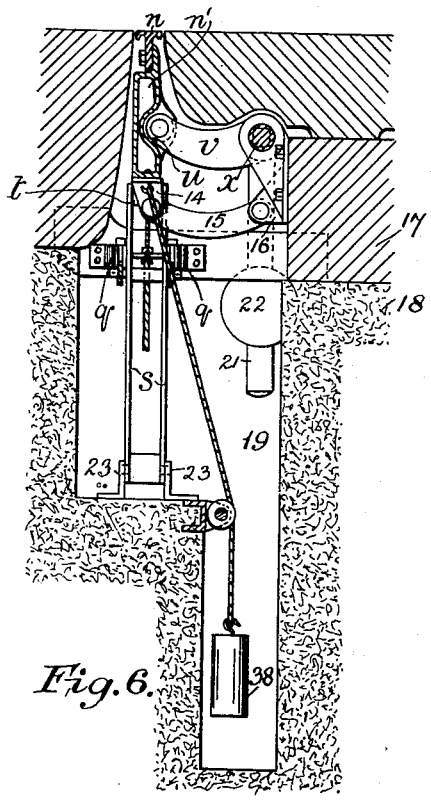
Figure 7:
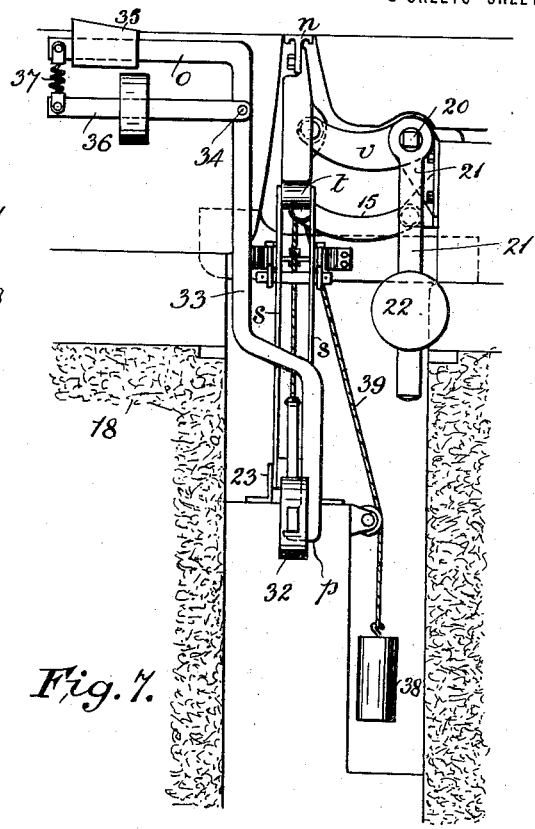
Figure 8:
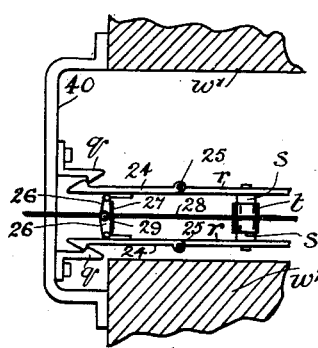
Figure 9:
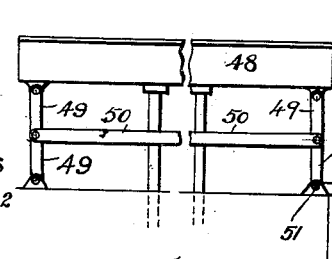
Figure 10:
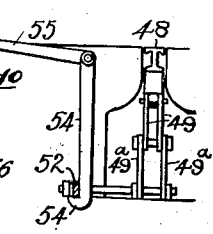
Figure 11:
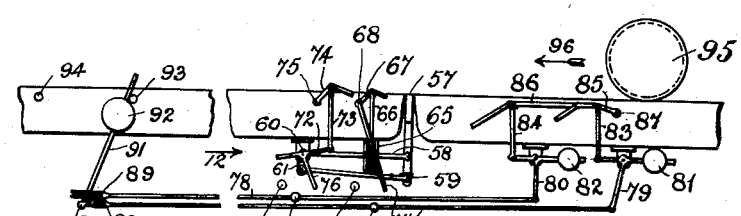
Figure 12:

In these drawings:—Figure 1 is a plan view of the plant for preparing the plates, and this view also shows in plan view the annealing chambers located at or near the inlet end of the cooling channel. Fig. 2 is a diagrammatic end view of the table and the guillotine used for cutting the coherent plate into sheets. Fig. 3 is an enlarged section of the guillotine blade on the line 3—3 of Fig. 2. The blade is shown about to enter the plates between adjacent sections of the table. Fig. 4 is a plan view of a portion of the table in the neighborhood of adjacent sections. Fig. 5 is an elevation of the table and fall bar mechanism shown in Fig. 4, the lower section $w$ in Fig. 4 being removed. Fig. 6 is an enlarged transverse section on the line 6—6 of Fig. 4. Fig. 7 is a partial side elevation of the table near the junction of two sections and looking in the direction of the arrow 7 in Fig. 5. Fig. 8 is a plan view of the release mechanism for the fall bar. Fig. 9 is a somewhat diagrammatic elevation showing a modified form of mechanism for operating the fall bar. Fig. 10 is an end view looking in the direction of the arrow 10 in Fig. 9. Fig. 11 is a diagrammatic side view of a further form of fall bar mechanism. Fig. 12 is a partial view of the fall bar mechanism shown in Fig. 11, and looking in the direction of the arrow 12 in Fig. 11.

In carrying the invention into effect the molten glass, carried in a pot $a$ by a crane $b$, running on rails $b'$, $b^2$, is poured in a heap in front of a roller $c$ and on to a pouring table. The pouring table is composed of separate sections $w$, $w'$, $w^2$, $w^3$, $w^4$. The roller $c$ is traversed over the sections by means of a windlass $d$ and rope $e$. After the roller $c$ has passed the junction between two sections, say $w$ and $w'$, suitable cutting mechanism is brought into operation to sever the coherent plate rolled from the poured mass, into separate sheets. In the form illustrated this cutting mechanism is shown as composed of a guillotine $f$ (see Fig. 2), which is adapted to slide vertically in a guide $g$, being released by a trigger catch $h$. The guillotine preferably is of inverted V-shape as shown, so as to commence cutting the plate from the outside and the line of cut traverses from the outside to the center. The guillotine is also preferably arranged to cut a strip from the coherent plate. To this end the blade $i$ of the guillotine is given the section shown in Fig. 3 where the blade is of inverted U-shape with resilient spring side legs $i'$ and $i^2$, while the outside dimension $i^3$ of the guillotine blade is slightly greater than the width of the space $i^4$ between adjacent table sections $w'$ and $w^2$. The inside dimension $i^5$ of the guillotine is, of course, slightly less than the width $i^4$. In this way a sure and clean severance of the sheets is secured. When the roller $c$ has passed the junction between the sections $w'$ and $w^2$, and a sheet has been severed corresponding in area to the area of the section $w'$, a pusher $j'$ is brought opposite the flattened out plate, which plate is then pushed transversely of the table over a bridge $k$ into the first annealing chamber $m'$ of the continuous leer. While this operation is being effected the roller is still proceeding to flatten out the original poured mass so as to produce a plate of uniform thickness. The thickness of the plate is determined by spacing means located at the end of the roller. Such spacing means may conveniently be rims $c'$ near the outer ends of the roller. When the roller has passed the junction between the sections $w^2$ and $w^3$, a further sheet corresponding in area to the area of the table section $w^2$ is cut from the coherent plate by guillotine mechanism as described with reference to Figs. 2 and 3. This sheet is then pushed into the chamber $m^2$ by a pusher $j^2$. In the same way a third sheet corresponding in area to the table $w^3$ is severed from the coherent plate when the roller has passed the junction between the section $w^3$ and the tail section $w^4$. This third plate is pushed transversely into the compartment $m^3$ of the annealing chamber by a pusher $j^3$.

A feature of the present invention consists in the provision of a plurality of chambers $m'$, $m^2$, $m^3$, located adjacent to a plurality of tables or table sections $w'$, $w^2$, $w^3$, and adapted to receive plates from said sections in immediate succession. Various methods have been adopted hitherto for the efficient and continuous working of such annealing leers, or continuous annealing chambers, but so far as I am aware it is novel to provide a plurality of closely arranged tables on which successive plates are rolled out and are successively pushed into annealing chambers. The annealing chambers $m'$, $m^2$, $m^3$, are of the usual form and provided with fixed rigid bases. The plate in the compartment $m^3$, is then pushed progressively at the required times into the compartments M', M², M³, M⁴, before it enters the cooling channel M, which is provided with the usual mechanism for causing the plates to travel through it. The plate in the compartment $m^2$ is pushed into the compartment $m^3$, and then follows the path described for the plate from the compartment $m^3$. The plate from the compartment $m'$ is pushed successively into compartment $m^2$, $m^3$, M', M², M³, M⁴, and so into the cooling channel. It is not essential that the chambers $m'$, $m^2$ and $m^3$, are all arranged at the same side of the table as illustrated, nor is it essential that only three compartments are provided, but it will be understood that the compartments $m'$, $m^2$, $m^3$, are all retained at substantially the same temperature. The table sections $w'$, $w^2$, $w^3$, $w^4$, are all spaced apart as shown at $i^4$ in Fig. 3. During the time the roller $c$ is flattening out a plate of glass on the table the space $i^4$ is filled by a fall bar $n$. Immediately the roller passes over the junction between two table sections the fall bar $n$ is caused to drop and thereby allow the guillotine to sever a sheet from the coherent plate being rolled. The drop of the fall bar $n$ is preferably effected automatically by means which are now about to be described more particularly with reference to Figs. 4 to 8. The roller $c$ after it has traversed over a fall bar $n$ impinges on a lever $o$ and thereby releases a trigger $p$ which in turn releases catches $q$. The catches $q$ are carried by a rod or rods $r$ which connect levers $s$ having rollers $t$ which support the fall bar $n$. The weight of the fall bar causes the levers $s$ to fall over in a clockwise direction in Fig. 5, and the fall bar drops. If the fall bar is caused to drop vertically the amount of the drop must be greater than the height $h'$ of the inverted V in Fig. 2. For the purpose of diminishing the amount of the drop the fall bar is conveniently arranged to move downward and laterally. This also has the effect of allowing the removed strip of glass to fall clear of the top of the fall bar. The means by which this downward and lateral motion is produced will be more readily understood on reference to Fig. 6. The fall bar $n$ is conveniently carried by a water cooled hollow frame $n'$. This frame is provided with eyes $u$ to which there are pivoted levers $v$. The levers $v$ are keyed on a transverse shaft $x$, supported in bearings or brackets $y$ on the underside of the table sections $w'$, $w^2$, $w^3$, $w^4$. Brackets 14 receive levers 15 which are pivoted in brackets 16 fixed to the foundation plate 17. The foundation plate 17 rests on a solid concrete foundation 18. The levers $s$ and other parts are arranged inside a pit 19 in the foundation 18. The shaft $x$ passes out at the side of the table, as shown in Fig. 4, where it is provided with a square end 20 on which is fixed a lever 21 having a weight 22 clamped thereto. This weight, to some extent, balances the weight of the hollow carrier $n'$ and fall bar $n$. It does not, however, completely overbalance this carrier. The levers $v$ are spaced apart at suitable intervals as shown in Fig. 4 in dotted lines, and the levers 15 are arranged intermediate of the levers $v$. The levers $s$ are conveniently spaced approximately at the same distance as the levers $t$. The levers $s$ are duplicated and are pivoted in brackets 23 supported in the foundation. At a suitable height the levers $s$ are connected by a pair of rods $r$, $r$. The rods $r$, $r$, have at their left hand extremities in Fig. 5 pivoted portions or extensions 24, 24, thereon, these extensions being pivoted at 25 (see Fig. 8). The extensions 24 are normally held apart by toggle levers 26, 26, which are retained in their extended position (shown in Fig. 8) by a flat spring or the like 27. A rope 28 connects the joint 29 of the toggle levers 26 to one leg 30 of an angle lever, the other leg 31 of which is supported by the catch $p$. The leg 31 is weighted at 32. The catch $p$ is carried by a lever 33, pivoted at 34, this lever 33 being extended to form the lever $o$ which has a striker shoe 35 thereon adapted to engage with the roller $c$. To insure complete removal of the catch p, the weighted lever 36 connected to the lever o by a spring 37, is conveniently provided. To assist the fall of the fall bar n, weights 38 connected by ropes 39 to the bottom carrier n' of the fall bar are conveniently provided.

The operation of the mechanism as described is as follows:—The roller, after it passes over the fall bar n, strikes the shoe 35 and thereby depresses the lever o and causes the lever 33 and catch p to swing counter-clockwise in Fig. 7, and thereby releases the weighted lever 31. The lever 31 swings in a clockwise direction and applies a tension to the rope 28, which pulls the joint 27 of the toggle levers 26 and thereby removes the pivoted extensions 24 from the fixed catches q. The catches q, as can be seen in Fig. 8, are supported in a yoke 40, fixed to adjacent table sections $w'$ and $w^2$. The rods r, connecting the levers s, are thereby liberated and the fall bar n, carrier n', and weights 38, move downward under the action of gravity. At the same time the fall bar n and carrier n' are guided to move transversely owing to the provision of the levers v. The levers s fall a considerable distance and they in no way interfere with the operation of the guillotine. The lateral movement of the fall bar n removes this fall bar out of the region occupied by the guillotine. As soon as the fall bar is dropped in the manner described, the guillotine i is caused to fall by pulling the rope $h^2$, which releases the catch h. The separate sections $w'$, $w^2$, $w^3$, of the table are separately cooled by water circulated by pipes 41 through the body of the table. The inlet is conveniently arranged at 42 and the outlet at 43. These separate inlets and outlets are served by supply pipes 44 and return pipes 45. By arranging the table in sections and cooling the sections separately the requirements of working of the various sections may be fully met. Thus, the section $w'$ is liable to be heated more than the section $w^2$, because the heap of glass on the section $w'$ is greater than that on the section $w^2$, and in the same way the heap of glass on the section $w^2$ is greater than that on the section $w^3$. Suitable means, such as cocks indicated at 46 may be provided in the connections, 41. The fall bar may be again reset by operating the lever 21 and pulling the rope 47, so as to raise the lever s and rods r. The extensions 24 then snap into the catches q and the fall bar is again ready to be operated as described above.

According to the form of mechanism shown in Figs. 9 and 10 the fall bar 48 is supported on toggle levers 49, the joints of which are connected by rods 50. The end lever $49^a$ is keyed on a cross spindle 51 and on this same spindle there is provided a lever 52 weighted at 53. A catch lever 54 is operated by the traveling roller, such as c, to release the lever 52 and thereby to allow the bar 48 to fall under the action of gravity. The lever 54 is moved to release the lever 52 by the depression of a lever 55. In this form the fall bar 48 is raised back into position when required by pulling a rope 56.

In the forms described above the fall of the fall bar is effected by the roller c and the replacing of the fall bar is effected by hand. According to the form shown in Figs. 11 and 12, the fall bar is not only caused to fall vertically and laterally, but mechanism is provided by means of which the replacing of the fall bar is effected by the roller. It will be understood that in working this invention with a series of tables the initial pour is usually made on the same section, although this is not essential to the invention and indeed in some cases it may be advisable to pour the mass of glass alternately at opposite ends, so as to secure uniform heating of the table sections and also so as to give a longer period of time of cooling for the first section to receive the mass of glass. The cooling referred to takes place between successive casting operations, as it is usual to roll out the contents of successive pots on the tables at intervals of about a quarter of an hour to half an hour. Assuming, however, that the metal is always poured from the pot on to the same table section, the apparatus shown in Figs. 11 and 12 may with advantage be used. In this form the fall bars 57 are supported by levers 58, 59, pivoted at 60 and 61, respectively. The levers 58 are normally held in place by catches 62 carried by a slide rod 63. The slide rod 63 is connected at one end to an angle lever 64, which is pivoted on a bracket 65 on the underside of the table. The other arm of the angle lever 64 is connected by a rod 66 to a bent lever 67, pivoted at 68. To the pivot 68 of the lever 67 there is also keyed a lever 69, which is adapted to coöperate as hereinafter described, with a roller 70 on a rod 71. The pivot 60 has keyed to it a lever 72 which is connected by a rod 73 to a bent lever 74 pivoted at 75. The pivot 60 is also provided with an arm 76 adapted, as hereinafter described, to coöperate with a roller 77 on a rod 78. The rods 71 and 78 are connected at the right hand end to levers 79 and 80. The levers 79 and 80 have the tendency to move continually clockwise under the action of weighted arms 81 and 82. The weighted arms 81 and 82 are extended and are connected by rods 83 and 84 to bent levers 85 and 86 which are pivoted at 87. The bent lever 86 is preferably provided with a horizontal portion as shown for the purpose hereinafter to be described. The opposite ends of the rods 71 and 78 are slotted and each of these slotted ends engage in pins on levers 88, 89. These levers are pivoted on a cross spindle 90 to which there is keyed a lever 91 weighted as at 92 and adapted to swing between stops 93 and 94.

The operation of this mechanism is as follows: Assuming the roller 95 to move outward in its operative traverse in the direction of the arrow 96, the levers 85 and 86 are then in the position shown and are not struck by the roller 95 as it moves in the direction of the arrow 96. When the roller strikes the lever 67 the arm 66 is moved downward and the angle lever 65 is swung so as to remove the catches 62 from beneath the levers 58. The fall bars 57 are thereby free to fall under gravity. If they do not fall by the action of gravity they are pushed down by the roller striking the bent lever 74 whereby the rod 73 is pushed downward and the lever 72 caused to swing in a clockwise direction, whereby the lever 58 also swings in a clockwise direction in Fig. 11. The fall bar 57 is thereby moved downward and laterally in a manner similar to that described with reference to Fig. 6 above. When the roller 96 has traversed over the various sections it strikes the lever 91 and swings it over, so as to move it from the stop 93 to the stop 94. The levers 88 and 89 thereby swing about their pivot 90 and raise the rods 71 and 78, so that the rollers 70 and 77 come into the paths of the arms 69 and 76 respectively and take up a position on the left hand side of these arms in Fig. 11. The positions are indicated by the circles 97 and 98. The raising of the rods 71 and 78 has moved the pins of the levers 88 and 89 toward the left as will be readily understood, the weighted arms 81 and 82 thereby swing in a clockwise direction and raise the levers 85 and 86 upward into the path of the returning roller. When the roller reaches the lever 86 this lever is depressed and the rod 78 is moved from left to right, whereby the roller 77 presses the arm 76 and thereby swings the pivot 60 and arm 58 to raise the fall bar 57. The fall bar is retained in its raised position by the roller moving over the horizontal portion shown in Fig. 11 of the lever 86. When the roller reaches the lever 85 this lever is depressed from the raised position to the lowered position indicated and thereby the lever 79 is swung in a counter-clockwise direction and the rod 71 moves from left to right. The roller 70 thereby moves the arm 69 which raises the bent lever 67 and rod 66 which in turn passes the catch 62 underneath the levers 58, which are thereby retained in position ready to be operated again in the manner described. The slotted ends of the rods 71 and 78 permit the lateral movement from left to right which is required to produce the operation of the arms 76 and 69. The left hand extremity of the slotted end of the rod 71 comes into operation to return the lever 91 to the position illustrated in full lines. The end of the rod 78 is conveniently forked but the end of the rod 71 is slotted as shown so as to effect the return of the lever 91.

I claim:

1. In plate glass forming apparatus, the combination with a table having a plurality of sections spaced apart, of bars normally approximately filling the spaces between the consecutive sections, respectively, flush with the latter and arranged for downward movement in said spaces, means for moving the bars downwardly at proper times, and cutting devices operating at said spaces to sever a glass sheet spanning the spaces and unsupported by the bar at the point of severing.

2. The combination with a table having sections separated by a narrow space, of a bar approximately fitting and normally held in the upper portion of said space to make the table surface substantially continuous, means whereby the bar moves below said surface at proper times, and means for cutting from a plastic glass sheet spanning said space a narrow strip of glass normally lying over said space.

3. The combination with a casting table divided transversely into sections separated by a narrow space, of a bar normally held in said space flush with the table's surface, means for moving the bar downwardly and laterally to leave said space open, and means for them dividing along said space a plastic sheet of glass spanning the space.

4. Apparatus for use in casting glass plates comprising a table having a plurality of sections spaced apart, fall bars operable in the spaces between said table sections, said fall bars being normally flush with the table, a roller traversable over said table sections in series, means operated by said roller for causing said fall bars to drop after the roller has passed the junction of two adjacent table sections, and cutting means operable at the said junction subsequent to the drop of the fall bars.

5. Apparatus for use in casting glass plates comprising a table, having a plurality of sections spaced apart, fall bars operable in the spaces between said table sections, said fall bars being normally flush with the table, a roller traversable over said table sections in series, means operated by said roller for causing said fall bars to drop vertically and laterally clear of the opening between the table sections after the roller has passed the junction of two adjacent table sections, and cutting means operable at the said junction subsequent to the drop of the fall bars.

6. Apparatus for use in casting glass plates comprising a table having a plurality of sections spaced apart, fall bars operable in the spaces between said table sections, said fall bars being normally flush with the table, pivoted levers supporting said fall bars in their raised positions, catch mechanism holding said pivoted levers in said supporting position, a roller traversable over said table sections in series, release mechanism for said catch mechanism operable by said roller for causing said fall bars to drop after the roller has passed the junction of two adjacent table sections and cutting means operable at the said junction subsequent to the drop of the fall bars.

7. Apparatus for use in casting glass plates comprising a table having a plurality of sections spaced apart, fall bars operable in the spaces between adjacent sections, levers pivoted to said fall bars and arranged in planes substantially transverse to said fall bars, means for supporting said fall bars in elevated position, said means being released by the roller after it has traversed over the junction of adjacent sections.

8. Apparatus for use in casting glass plates comprising a table having a plurality of sections spaced apart, fall bars operable in the spaces between adjacent sections, water cooled carriers for said fall bars, a roller traversable over said sections in series and means operable by the roller for causing said fall bars to drop after the roller has passed the junction between two adjacent sections.

9. Apparatus for use in casting glass plates comprising a table having a plurality of sections spaced apart, fall bars operable in the spaces between adjacent sections, a roller traversable over said table sections, means operable from said roller to drop said fall bars after the roller has passed the junction between two adjacent sections, means operable by the roller at the end of its traverse and during its return traverse for replacing said fall bars.

10. Apparatus for use in casting glass plates comprising, a table having a plurality of sections spaced apart, fall bars operable in the spaces between adjacent sections, pivoted levers supporting said fall bars, slide bars engaging beneath said levers to hold the fall bars in raised position, a roller traversable over said table sections, striking gear coöperating with said roller after the roller has passed the junction between adjacent sections, said striking gear being connected to said slide bars, striking gear coöperating with the roller after said first mentioned striking gear for the purpose of pressing said fall bars down, a pivoted lever coöperating with the roller at the end of its travel, setting gear operated by said pivoted lever, striking gear located at the end of the table opposite to said pivoted lever and set by the action of said setting gear to coöperate with said roller on its return movement, and means operated by said third mentioned striking gear for returning the fall bars into operative position.

In testimony whereof I have signed my name to this specification in the presence of two subscribing witnesses.

MAX BICHEROUX.

Witnesses:
W. DAEHLE,
ROB SPRINGER.